US011642824B2

(12) United States Patent
Halter et al.

(10) Patent No.: US 11,642,824 B2
(45) Date of Patent: May 9, 2023

(54) INJECTION MOLDING APPARATUS AND METHOD OF DETECTING MISALIGNMENT IN THE INJECTION MOLDING APPARATUS

(71) Applicant: HUSKY INJECTION MOLDING SYSTEMS LTD., Bolton (CA)

(72) Inventors: Christophe Halter, Arlon (BE); Teng Guo, Richmond Hill (CA)

(73) Assignee: HUSKY INJECTION MOLDING SYSTEMS LTD., Bolton (CA)

( * ) Notice: Subject to any disclaimer, the term of this patent is extended or adjusted under 35 U.S.C. 154(b) by 471 days.

(21) Appl. No.: 16/754,340

(22) PCT Filed: Sep. 12, 2018

(86) PCT No.: PCT/CA2018/051126
§ 371 (c)(1),
(2) Date: Apr. 7, 2020

(87) PCT Pub. No.: WO2019/075554
PCT Pub. Date: Apr. 25, 2019

(65) Prior Publication Data
US 2021/0237326 A1 Aug. 5, 2021

Related U.S. Application Data

(60) Provisional application No. 62/574,272, filed on Oct. 19, 2017.

(51) Int. Cl.
B29C 45/80 (2006.01)
G01B 7/16 (2006.01)
(Continued)

(52) U.S. Cl.
CPC .............. B29C 45/80 (2013.01); G01B 7/18 (2013.01); G01B 7/31 (2013.01); G05B 19/406 (2013.01);
(Continued)

(58) Field of Classification Search
CPC ..................... B29C 45/80; B29C 2043/5858
See application file for complete search history.

(56) References Cited

U.S. PATENT DOCUMENTS 2,692,527 A    10/1954   Wetzel et al.
5,507,097 A    4/1996    Duey et al.
(Continued)

FOREIGN PATENT DOCUMENTS

CA    2208270 C    5/2000
CA    2202493 C    4/2002
(Continued)

OTHER PUBLICATIONS

Rieken, DE 10 2009 049 733 A1, Machine Translation, Apr. 21, 2011 (Year: 2011).*
(Continued)

*Primary Examiner* — Galen H Hauth

(57) ABSTRACT

A misalignment sensing system for a molding structure and a method for using same. The molding structure includes a first component and a second component, at least one of the components being selectively repositionable between a closed configuration of the mold structure and an open configuration of the mold structure. The misalignment sensing system includes an alignment member including a male portion coupled to and extending from the first component of the molding structure, and a female portion defined in the second component of the molding structure, the female portion being configured to receive the male portion when the molding structure is in a closed configuration; and at least one sensor connected to one of the male and female portions and being configured to detect a deformation of any one of the male portion and the female portion, the deformation being induced by a misalignment of the molding structure.

20 Claims, 15 Drawing Sheets

(51) Int. Cl.
*G01B 7/31* (2006.01)
*G05B 19/406* (2006.01)
*G05B 19/4155* (2006.01)

(52) U.S. Cl.
CPC .............. *G05B 19/4155* (2013.01); *B29C 2945/76083* (2013.01); *B29C 2945/76254* (2013.01); *B29C 2945/76458* (2013.01); *B29C 2945/76481* (2013.01); *G05B 2219/45244* (2013.01)

(56) References Cited

U.S. PATENT DOCUMENTS

| | | | |
|---|---|---|---|
| 5,700,502 | A | 12/1997 | Hehl |
| 5,753,153 | A | 5/1998 | Choi |
| 5,846,573 | A * | 12/1998 | Wurst .................. G01L 5/0076 425/149 |
| 5,853,773 | A | 12/1998 | Choi |
| 5,856,875 | A | 1/1999 | Duey et al. |
| 6,068,463 | A | 5/2000 | Urbanek |
| 6,113,376 | A | 9/2000 | Eppich |
| 6,171,092 | B1 | 1/2001 | Galt et al. |
| 6,431,851 | B1 | 8/2002 | Ellinger et al. |
| 6,651,510 | B2 | 11/2003 | Noma |
| 6,688,871 | B1 | 2/2004 | Lee et al. |
| 6,722,875 | B2 | 4/2004 | Ralph et al. |
| 6,875,384 | B1 | 4/2005 | Whitney |
| 7,217,383 | B2 | 5/2007 | Hehl |
| 7,232,303 | B1 | 6/2007 | Dooley et al. |
| 7,534,102 | B2 | 5/2009 | Rossanese et al. |
| 7,580,771 | B2 | 8/2009 | Quail et al. |
| 7,641,463 | B2 | 1/2010 | Hsu |
| 7,658,601 | B2 | 2/2010 | Kasumi |
| 7,753,668 | B2 | 7/2010 | Glaesener et al. |
| 7,981,334 | B2 | 7/2011 | Chiang |
| 8,425,216 | B2 * | 4/2013 | Catoen .................. G06Q 30/04 425/169 |
| 8,636,495 | B2 | 1/2014 | Maruyama et al. |
| 8,651,846 | B2 | 2/2014 | Maruyama et al. |
| 2003/0185930 | A1 | 10/2003 | Hechtl |
| 2003/0219508 | A1 | 11/2003 | Hechtl et al. |
| 2005/0236725 | A1 | 10/2005 | Niewels et al. |
| 2006/0269652 | A1 | 11/2006 | Kalemba et al. |
| 2007/0218157 | A1 | 9/2007 | Tsai |
| 2008/0265465 | A1 | 10/2008 | Glaesener |
| 2015/0352766 | A1 | 12/2015 | Hontheim et al. |
| 2017/0252956 | A1 | 9/2017 | Huang et al. |

FOREIGN PATENT DOCUMENTS

| | | | |
|---|---|---|---|
| CA | 2972004 A1 | 8/2014 | |
| DE | 102009049733 A1 * | 4/2011 | ............. B22D 17/22 |
| DE | 102009049733 A1 | 4/2011 | |
| JP | 2000309037 A | 11/2000 | |
| JP | 2008265018 A | 11/2008 | |
| JP | 2012116100 A | 6/2012 | |
| WO | 2011130847 A1 | 10/2011 | |
| WO | 2017024381 A1 | 2/2017 | |

OTHER PUBLICATIONS

PCT International Search Report; Zarifa, Adeeb; 3 pages, dated Nov. 21, 2018.

* cited by examiner

INJECTION MOLDING APPARATUS AND METHOD OF DETECTING MISALIGNMENT IN THE INJECTION MOLDING APPARATUS

FIELD

This application relates to alignment of molding structures in general and, more specifically, a misalignment detecting system for a molding structure and a method of detecting misalignment in the molding structure.

BACKGROUND

In many typical molding structures, the molding process includes cycles of bringing complementary mold parts with features defining a molded article to be molded into close proximity or more typically into direct contact. Generally one of the complementary parts is stationary, and the other is moveable with respect to the stationary part. An example of such mold parts is two mold halves, one being associated with a stationary platen and the other one being associated with a movable platen of a mold clamp in an injection molding machine.

Quality of molded articles relies on many factors, including the relative alignment of the two complementary mold parts. As the moveable mold part is generally heavy, undergoes fairly rapid translation during molding cycles, and can be subject to various vibrations, it is known that constant vigilance is needed to maintain an optimal relative alignment between the two complementary mold parts.

It is well known in the art of molding using a moveable mold component and a stationary mold component to include various alignment members that must fit together in order for the mold to close. One such alignment member is a leader pin, which is configured to align the mold parts during the closing of the mold parts during an appropriate portion of the molding cycle.

Another such known alignment member is a straight lock. After leader pins connect, and as the mold parts approach closer, a male portion and a female portion of the straight lock align and are closed.

Solutions including sensors for alerting or recording misalignments have also been explored in the known solutions.

US patent publication 2015/0352766 discloses structure and steps for positioning a first mold part of a mold on a mold mounting face in an injection molding machine. In particular, the structure and steps may include a positioner that is configured to connect the first mold part to part of the injection molding machine, wherein the positioner is adjustable to position the first mold part across the mold mounting face.

U.S. Pat. No. 6,875,384 discloses a molding apparatus and method that includes an adjustable mold component and a fixed mold component for molding precision articles; a bias force mechanism for applying a bias force to the adjustable mold component; and an adjustable mold component fine position adjustment mechanism operable exteriorly of the mold for applying a position adjustment force to the adjustable mold component to overcome the bias force and thereby adjust position of the adjustable mold component relative to a fixed mold component to reduce positional offset in at least one adjustment dimension.

SUMMARY

Developers of the present technology have developed various embodiments thereof based on their appreciation of at least one technical problem associated with the prior art approaches to monitoring alignment in molding machines and, particularly, to detecting small misalignments of molding structures or molding machines. Specifically, Developers of the present technology have recognized structure and steps to adapt existing alignment structures, such as, for example, the tightly fitting straight lock, to measure deformation (e.g. strain) therein and thereby readily assess relative alignment of the mold parts. A technical effect of the foregoing may include reduced complexity as it is potentially unnecessary to include separate means to measure the misalignment before the straight lock engages and re-aligns the two halves.

As such, in accordance with a first broad aspect of the present technology, there is provided a misalignment sensing system for a molding structure, the molding structure being positionable in use in a mold for producing molded articles. The molding structure including a first component and a second component, at least one of the first component and the second component being selectively repositionable between a closed configuration of the mold structure and an open configuration of the mold structure. The misalignment sensing system comprising an alignment member comprising a male portion coupled to and extending from the first component of the molding structure, and a female portion defined in the second component of the molding structure, the female portion being configured to receive the male portion when the molding structure is in a closed configuration. At least one sensor connected to one of the male portion and the female portion, the at least one sensor being configured to detect a deformation of any one of the male portion and the female portion, the deformation being induced by a misalignment of between the first component of the molding structure and the second component of the molding structure.

In some embodiments, the misalignment sensing system further comprises a control unit communicatively coupled to the at least one sensor, the control unit configured to receive a sensed misalignment condition from the at least one sensor for processing thereof.

In some embodiments, the at least one sensor is connected to the male portion.

In some embodiments, the at least one sensor is disposed in at least one slot defined in the male portion.

In some embodiments, the at least one sensor includes a first sensor and a second sensor.

In some embodiments, the first sensor is disposed in a first slot defined in the male portion of the alignment member; and the second sensor is disposed in a second slot defined in the male portion of the alignment member, the second slot being parallel to the first slot.

In some embodiments, the first sensor is disposed in a first groove defined on a first side portion of the male portion of the alignment member; and the second sensor is disposed in a second groove defined on a second side portion of the male portion of the alignment member, the second side being opposite the first side.

In some embodiments, the male portion is configured to define at least one decoupling slot for allowing the first side portion and the second side portion to deform at least partially independently.

In some embodiments, the at least one decoupling slot is between and parallel to the first side portion and the second side portion.

In some embodiments, the at least one decoupling slot comprises two intersecting slots.

In some embodiments, the at least one sensor comprises at least one Wheatstone bridge strain gauge.

In some embodiments, the at least one sensor comprises at least one Piezo film sensor.

In accordance with another broad aspect of the present technology, there is provided a method of detecting misalignment in a molding structure for producing molded articles using a misalignment sensing system. The molding structure including a first component and a second component, at least one of the first component and the second component being selectively repositionable between a closed configuration of the mold structure and an open configuration of the mold structure. The misalignment sensing system including an alignment member including a male portion coupled to and extending from the first component of the molding structure, and a female portion coupled to the second component of the molding structure, the female portion being configured to receive the male portion when the molding structure is in a closed configuration. The misalignment sensing system further includes at least one sensor connected to one of the male portion and the female portion, the at least one sensor being configured to detect a deformation of any one of the male portion and the female portion, the deformation being induced by a misalignment of between the first component of the molding structure and the second component of the molding structure. A control unit communicatively is coupled to the at least one sensor, the control unit configured to receive a sensed misalignment condition from the at least one sensor for processing thereof; the method being executed by the control unit. The method comprising causing the at least one sensor to sense, during a given molding cycle when the molding structure is actuated toward the closed configuration, strain on the one of the female portion and the male portion; receiving, by the control unit, at least one strain measurement from the at least one sensor; and determining, by the control unit, a misalignment of the first component of the mold structure and the second component of the mold structure based on the at least one strain measurement.

In some embodiments, the method further comprises determining, by the control unit, based at least in part on the at least one strain measurement, information related to at least one of a magnitude of misalignment, and a direction of misalignment; storing, in a storage device coupled to the control unit, the information; and storing, in the storage device, at least some additional information related to the given molding cycle of the molding structure.

In some embodiments, the method further comprises, after the determining the misalignment, determining that the misalignment is above a pre-determined threshold; and indicating to an operator of the molding structure, by the control unit, that the molding structure is misaligned, the indicating may include, for example, one or more of: sounding an alarm, turning on a light, and shutting down the molding structure.

In some embodiments, the method further comprises, after the determining the misalignment, determining that the misalignment is above a pre-determined threshold; and presenting a message to an operator of the molding structure, on a human-machine interface (HMI) communicatively connected to the control unit, that the molding structure is misaligned.

In some embodiments, the message further comprises information related to a magnitude of misalignment and a direction of misalignment.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
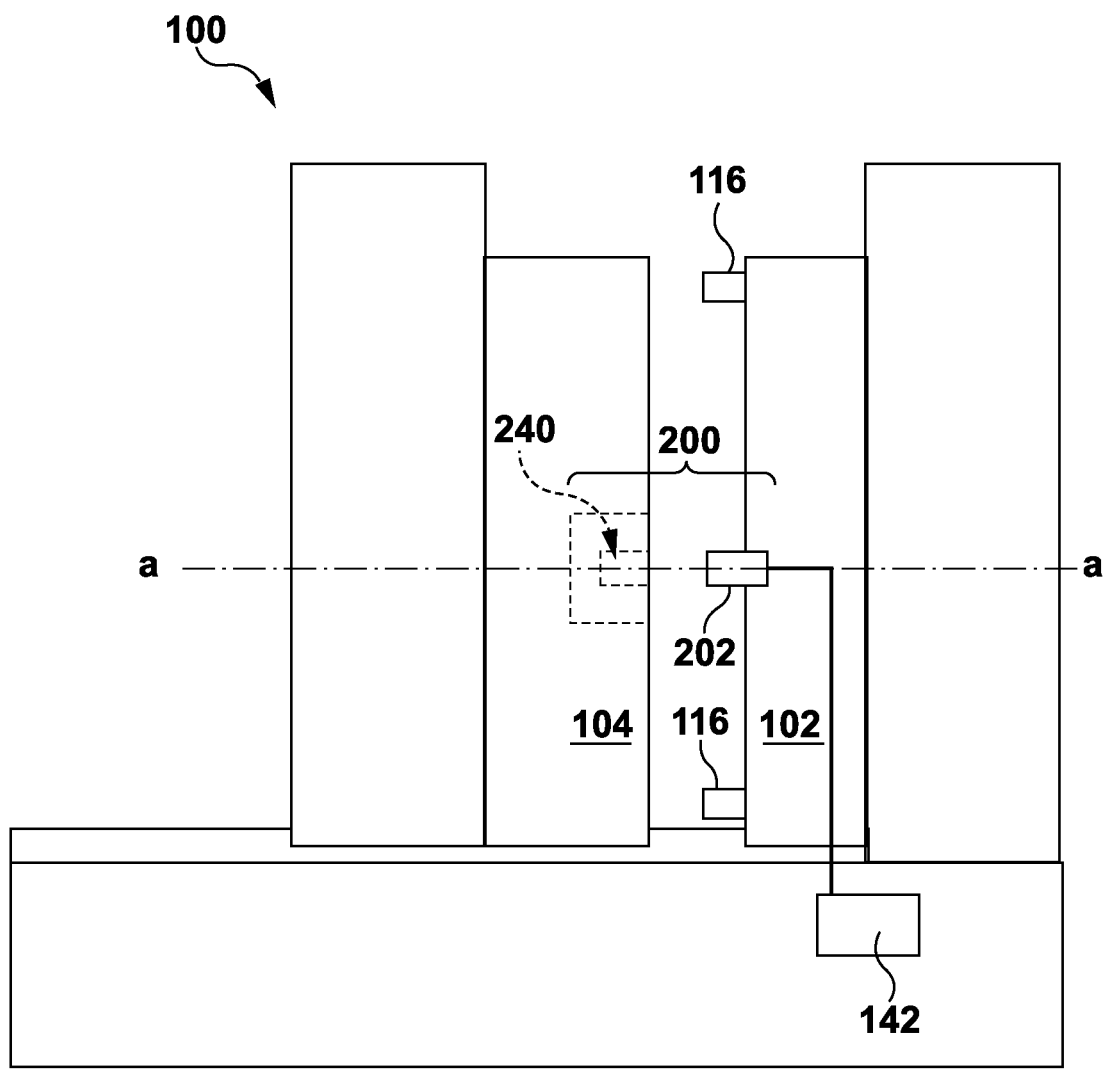
FIG. 1 depicts a side, cross-sectional schematic view of a molding structure having a misalignment sensing system in accordance with non-limiting embodiments of the present technology.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Reference will now be made in detail to various non-limiting embodiments for a misalignment sensing system for use in a molding structure. It should be understood that other non-limiting implementations, modifications and equivalents will be evident to one of ordinary skill in the art in view of the non-limiting implementations disclosed herein and that these variants should be considered to be within scope of the appended claims. Furthermore, it will be recognized by one of ordinary skill in the art that certain structural and operational details of the non-limiting implementations discussed hereafter may be modified or omitted altogether (i.e.

non-essential). In other instances, well known methods, procedures, and components have not been described in detail.

It is to be further expressly understood that the misalignment sensing system and its components are depicted merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the misalignment sensing system and/or its components may also be set forth below. This is done merely as an aid to understanding, and, again, not to define the scope or set forth the bounds of the present technology. These modifications are not an exhaustive list, and, as a person skilled in the art would understand, other modifications are likely possible.

Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the misalignment sensing system and/or its components may provide in certain instances simple embodiments of the present technology, and that where such is the case they have been presented in this manner as an aid to understanding. As persons skilled in the art would understand, various implementations of the present technology may be of a greater complexity. Furthermore, where specific details of the different implementations are presented with reference to discrete embodiments, a person skilled in the art is expected to combine specific implementational details of one discrete implementation with specific implementational details of another discrete embodiment, even though such a combination may not be expressly disclosed herein below.

Figure 2:
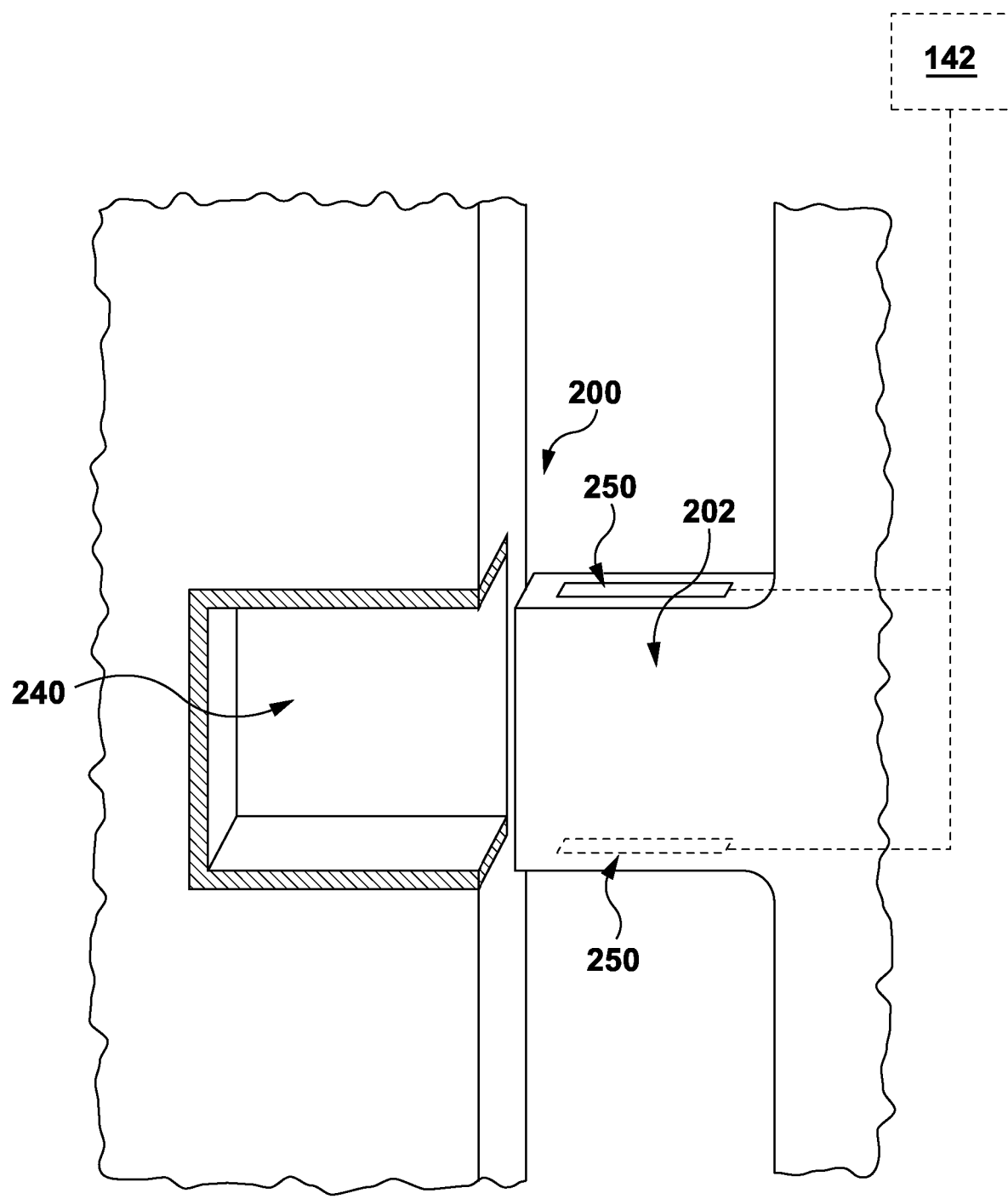
FIG. 2 depicts a perspective view of an alignment feature of the misalignment sensing system in the molding structure of FIG. 1.

FIGS. 1 and 2 schematically depict an example embodiment a misalignment sensing system 200 utilized in a molding structure 100 for forming molded articles from molding material. For ease of description, the molding structure 100 will be described as an injection molding machine 100 in the example of FIG. 1, although this is not meant to be limiting in any way. It is contemplated that embodiments of the present technology of misalignment sensing systems 200 could be applied to other types of molding structures including, but not limited to: transfer molding machines, compression molding machines, injection compression molding machines and the like As an illustrative non-limiting embodiment of the present technology, the injection molding machine 100 comprises a fixed platen and a movable platen. In some embodiments of the present technology, the injection molding machine 100 may include a third non-movable platen (not depicted). Alternatively or additionally, the injection molding machine 100 may include turret blocks, rotating cubes, turning tables and the like (all not depicted but known to those of skill in the art).

The injection molding machine 100 further comprises an injection unit (not separately depicted) for plasticizing and injection of the molding material. The injection unit can be implemented, for example, as a single stage or a two-stage injection unit. The injection molding machine 100 can included multiple instances of the injection unit 106—each one for preparing and injection a different type of molding material, e.g. a first molding material and a second molding material.

In operation, the movable platen is moved towards and away from the fixed platen by means of stroke cylinders (not separately depicted) or any other suitable means. Clamp force (also referred to as closure or mold closure tonnage) can be developed within the injection molding machine 100, for example, by using tie bars (not separately depicted) 110 and a clamping mechanism (not separately depicted). It will be appreciated that clamp tonnage can be generated using alternative means, such as, for example, using a column-based clamping mechanism, a toggle-clamp arrangement (not separately depicted) or the like.

A first mold half can be associated with the fixed and a second mold half can be associated with the movable platen. The first mold half (not separately numbered) comprises one or more mold cavities (not separately numbered). As will be appreciated by those of skill in the art, the one or more mold cavities (not separately depicted) may be formed by using suitable mold inserts (such as a cavity insert, a gate insert and the like) or any other suitable means. As such, the first mold half can be generally thought of as a "mold cavity half". The first mold half may be further associated with a melt distribution network (not separately depicted), commonly known as a hot runner, for distributing molding material from the injection unit to each of the one or more mold cavities.

The second mold half comprises one or more mold cores (not separately depicted) complementary to the one or more mold cavities. As will be appreciated by those of skill in the art, the one or more mold cores may be formed by using suitable mold inserts or any other suitable means. As such, the second mold half can be generally thought of as a "mold core half".

Therefore, it can be said that the injection molding machine 100 has a stationary component 102 and a moveable component 104 between which is a mold cavity is formed. The stationary component 102 can be the aforementioned first mold half. The moveable component 104 can be the aforementioned second mold half.

Within the embodiment depicted in FIG. 1, there is also provided a machine control unit 142. The machine control unit 142 generally executes one or more functions to control operations of one or more of the components of the injection molding machine 100. Within various embodiments of the present technology, the machine control unit 142 can be implemented as a computing apparatus which could include, but is not limited to: a processor, a memory, computer executable instructions, a human-machine interface (HMI), a display screen, etc. Other hardware and software, conventional and/or custom, may also be included depending on the requirements of any particular embodiment of the molding structure 100.

The moveable component 104 is moveable with respect to the stationary component 102 between a closed position (not shown), and an open position (depicted in FIG. 1) in which the moveable component 104 is withdrawn away from the stationary component 102 along axis "a-a" (referred to as an "operational axis" of the injection molding machine 100).

In order to detect and monitor the relative alignment of the components 102, 104, the injection molding machine 100 has been provided with the misalignment sensing system 200 for sensing a misalignment between the moveable component 104 and stationary component 102.

The misalignment sensing system 200 includes an alignment member formed from two complementary portions: a male portion 202 and a female portion 240. In the present embodiment, the alignment member is implemented as a straight lock. However, it should be expressly understood that the alignment member is not limited (in form factor or otherwise) to the straight lock. As such, any other implementation of the alignment member is feasible.

One of the male portion 202 and the female portion 240 are associated with the stationary component 102 and the moveable component 104, and the other one of male portion 202 and the female portion 240 are associated with the other one of the stationary component 102 and the moveable component 104. Broadly speaking, when the stationary component 102 and the moveable component 104 are aligned, the male portion 202 and the female portion 240 are also aligned. As the stationary component 102 and the moveable component 104 become misaligned, the male portion 202 and the female portion 240 also become misaligned (same applies to other cooperating male and female parts associated with the stationary component 102 and the moveable component 104, such as alignment features, molding components, etc.). As the male portion 202 and the female portion 240 start to collide, portions of the male portion 202 and/or the female portion 240 start to be subject to wear.

In the specific embodiment illustrated in FIG. 1, the male portion 202 is connected to and extends from the stationary component 102 and the female portion 240 is defined in the moveable component 104. As has been alluded to above, this is not meant to be limiting, however. In some embodiments, for example, the relative positions of the male and female portions 202, 240 could be reversed. The male portion 202 could be connected to and extend from the moveable component 104 and the female portion 240 could be defined in the stationary component 102.

The male portion 202 includes two sensors 250 (see FIG. 2) configured to detect a deformation of the male portion 202, with specific details of the male portion 202 and the sensors 250 being described in more detail below. The deformation detected by the sensors 250 is that induced by a misalignment between the moveable component 104 and the stationary component 102 of the injection molding machine 100 (the misalignment being translated to one or bot of the male portion 202 and the female portion).

The specific depicted embodiment of the male portion 202 including two sensors 250 is not meant to be limiting, however. It is contemplated that the male portion 202 may include more or fewer than two sensors 250. It is also contemplated that the female portion 240, rather than the male portion 202, could include one or more sensors 250 in some embodiments (in addition or instead of the male portion 202 housing the two sensors 250).

While only one misalignment sensing system 200 is illustrated in FIG. 1, the molding structure 100 could include two, three, or more misalignment sensing systems 200. Such an embodiment of a molding structure 100' is illustrated as one non-limiting example in FIG. 3. In this example, the molding structure 100' includes two identical misalignment sensing systems 200, one disposed generally vertically above the other.

While the molding structure 100' only has misalignment sensing systems 200 arranged along a same vertical axis, it is contemplated that the plurality of the misalignment sensing systems 200 could be disposed along different positions along the vertical and horizontal axes of the molding structure 100'. It is contemplated that a plurality of misalignment sensing systems 200 could be implemented along different axes and/or with different orientations in order to additionally determine not tip/tilt errors, along with the vertical misalignment (sag) as described above.

FIGS. 4 to 8 depict the male portion 202 and the sensor 250 of the misalignment sensing system 200 in greater detail.

Figure 3:
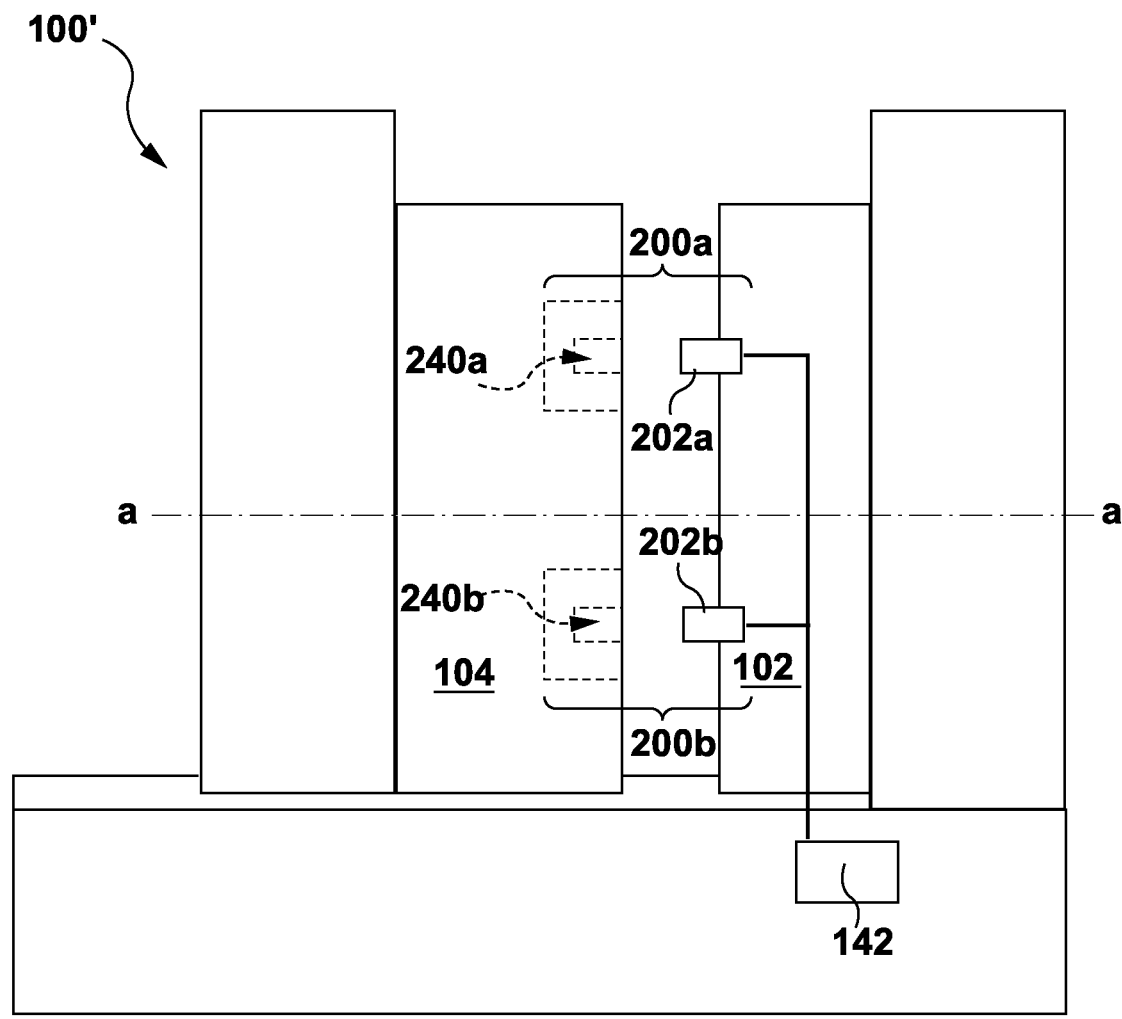
FIG. 3 depicts a cross-sectional schematic view of a molding structure with two of the misalignment sensing system of FIG. 1.
Figure 4:
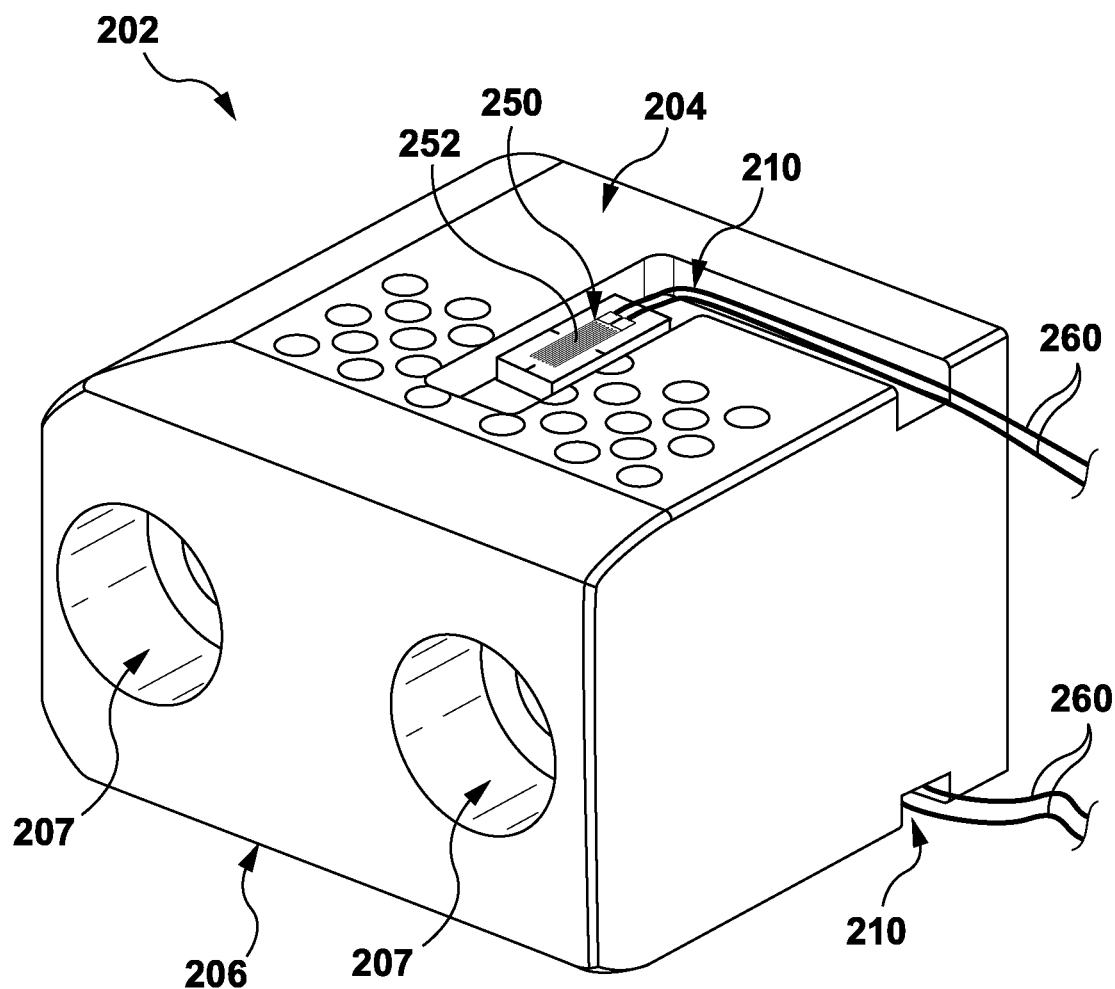
FIG. 4 depicts a perspective view of a male portion of the alignment feature of FIG. 2, implemented in accordance with a first non-limiting embodiment of the present technology.

The male portion 202 is connected to stationary component 102, as is illustrated in FIGS. 1 and 3. The male portion 202 defines two counter-bored through-holes 207 through which bolts are inserted for fastening the male portion 202 to stationary component 102.

In the depicted non-limiting embodiment of the present technology, the sensor 250 is implemented as a strain gauge 250, which will be described in more detail herein below. It is however contemplated that the sensor 250 can be implemented differently and can take different forms without departing from the scope of the present technology. As will also be described in more detail herein below, the sensor 250 can also be implemented as a Piezo film sensor.

Figure 5:
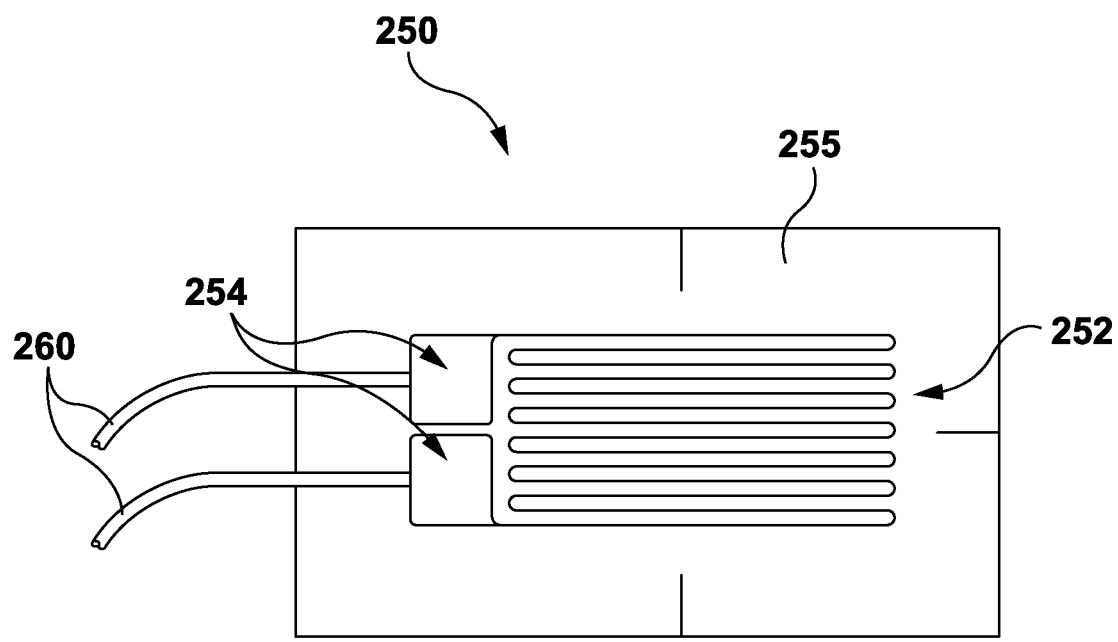
FIG. 5 depicts a schematic view of a strain sensor of the alignment feature of FIG. 2.
Figure 7:
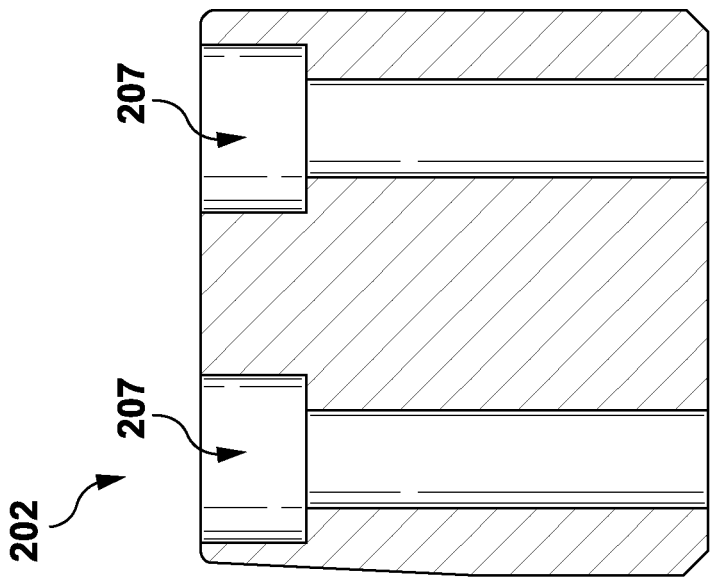
FIG. 7 depicts a cross-sectional view of the male portion of FIG. 4, taken along line 7-7 of FIG. 6.
Figure 6:
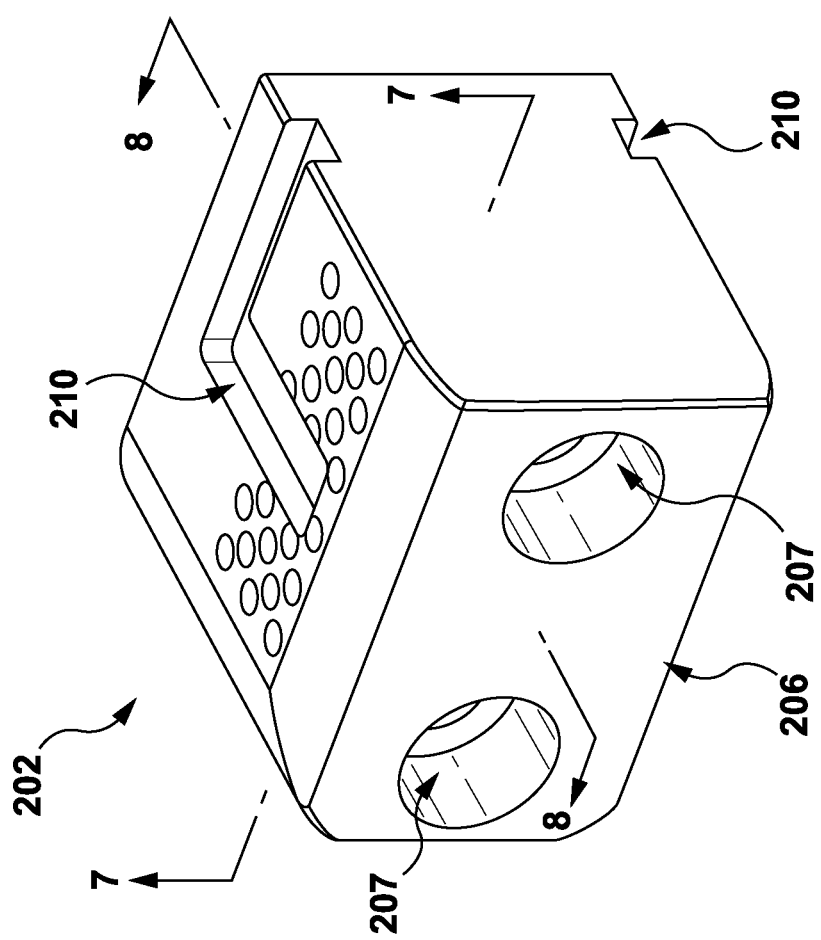
FIG. 6 depicts the perspective view of the male portion of FIG. 4, with the strain sensors removed.
Figure 8:
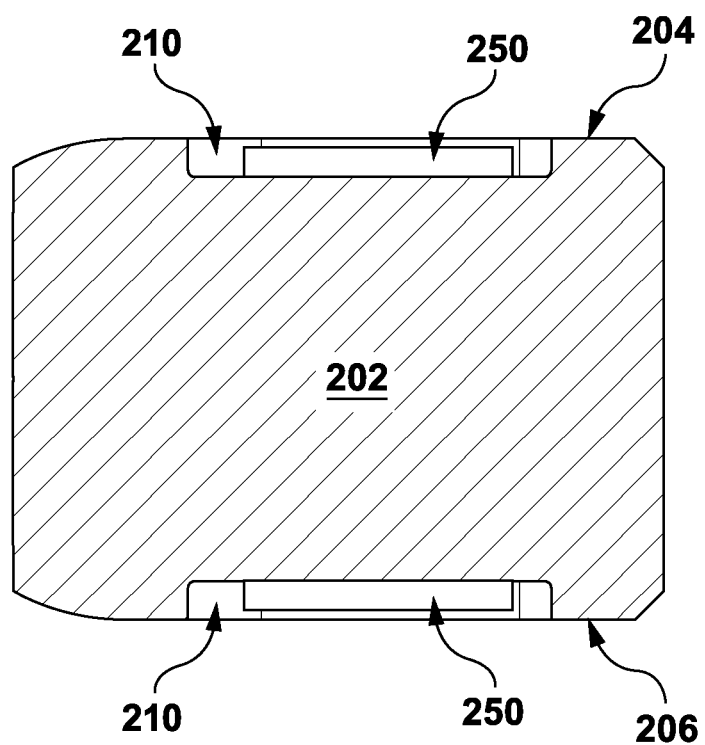
FIG. 8 depicts a cross-sectional view of the male portion of FIG. 4, taken along line 8-8 of FIG. 6.
Figure 9:
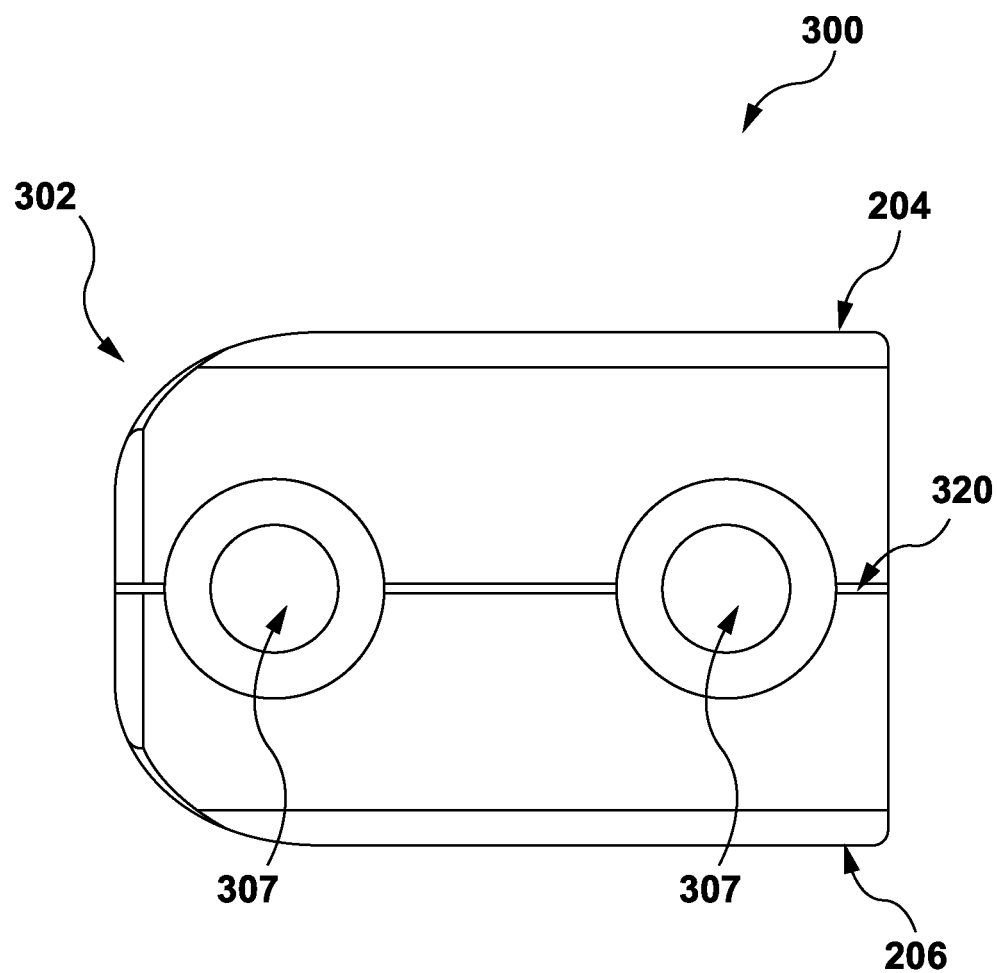
FIG. 9 depicts an elevation view of a male portion of an alignment feature implemented in accordance with another non-limiting embodiment of the present technology.

The sensor 250 (being implemented as the strain gauge 250 in this embodiment) is shown in more detail in FIG. 5. Only the upper strain gauge 250 (shown in FIG. 4) will be described; the lower sensor 250 is an identical strain gauge 250 oriented in a mirror image orientation to the upper strain gauge 250.

The strain gauge 250 includes a flexible substrate 255, the bottom side of which is coupled to a groove 210 (also referred to as a slot). Disposed on the flexible substrate 255 is a resistor 252 with two lead contact pads 254. A lead 260 is soldered to each of the lead contact pads 254. As would be understood by a person of skill in the art, the resistor 252 has a variable resistance depending on the bending of the resistor 252. Bending of the resistor 252 is caused by bending of the flexible substrate 255, which in turn is caused by deformation of the male portion 202. As mentioned above, the male portion 202 is deformed when the components 102, 104 are misaligned, as the male portion 202 and the female portion 240 push against one another (or otherwise interact with each other) as the molding structure 100 is actuated into the closed position.

Although not shown, it would also be understood by the person of skill in the art that the resistor 252 is connected, via the leads 260, in a Wheatstone bridge arrangement to determine the resistance of the resistor 252. By determining the resistance of the resistor 252, or at least the change in resistance from an unloaded state, the deformation of the male portion 202 can be determined. Once calibrated to the molding structure 100, the misalignment of the moveable component 104 with respect to the stationary component 102 can then be thus calculated.

In accordance with the non-limiting embodiments of the present technology, the sensors 250 are communicatively coupled, via the leads 260, to the machine control unit 142. The machine control unit 142 then carries out the calculation of the misalignment, based on the signal received from the sensors 250. In some additional embodiments of the present technology, the machine control unit 142 also executes alerting an operator of the molding structure 100 of the misalignment, as will be described below with respect to a method executable by the machine control unit 142. It should be noted that it is contemplated that the misalignment sensing system 200 could include a control unit separate from the machine control unit 142, or a control unit distinct from, but in communication with, the machine control unit 142.

In accordance with the non-limiting embodiments of the present technology, the sensor 250 is configured to detect a misalignment from about 30 micrometers up to about 100 micrometers. In many molding structures 100, a relative displacement of less than 30 micrometers is not sufficiently severe to be problematic. It is contemplated, however, that in some alternative non-limiting embodiments of the present technology, it may be beneficial to reliably detect misalignments of less than 30 micrometers. Thus, in accordance with alternative non-limiting embodiments of the present technology, the sensor 250 can be configured to detect a misalignment of a different range.

FIGS. 9 to 12 depict another embodiment of a male portion 302 of an alignment member of a misalignment sensing system 300 according to alternative non-limiting embodiments of the present technology. It should be noted that same or similar features between the misalignment sensing system 300 and the misalignment sensing system 200 retain their same reference numeral.

The male portion 302 has two sensors 250 (not shown) disposed in the grooves 210 on the top and bottom sides 204, 206 (as is the case with the male portion 202). In accordance with these alternative non-limiting embodiments of the present technology, the male portion 302 further defines a decoupling slot 320.

Figure 12:
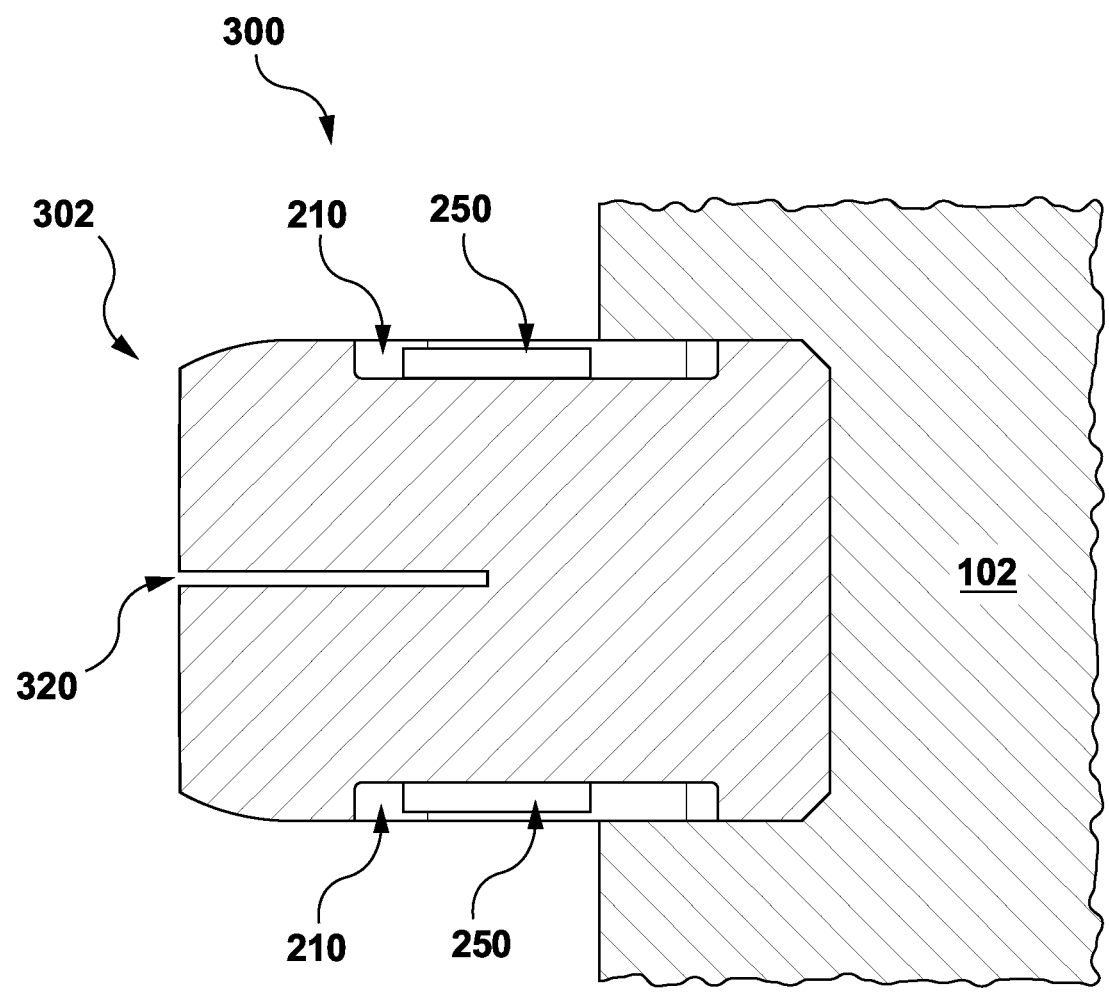
FIG. 12 depicts a cross-sectional view of the male portion of FIG. 9, taken along line 12-12 of FIG. 10.

Broadly speaking, the decoupling slot 320 is configured to allow a top portion of the male portion 302 (including the top groove 210 and the sensor 250) to deform at least partially independently from a bottom portion of the male portion 302 (including the bottom groove 210 and the sensor 250). As can be seen in FIG. 12, the decoupling slot 320 extends through part of the male portion 302, into at least the exterior surface of the stationary component 102. It is contemplated that the decoupling slot 320 could extend through more or less of the male portion 302, depending on the particular embodiment of the present technology.

Figure 11:
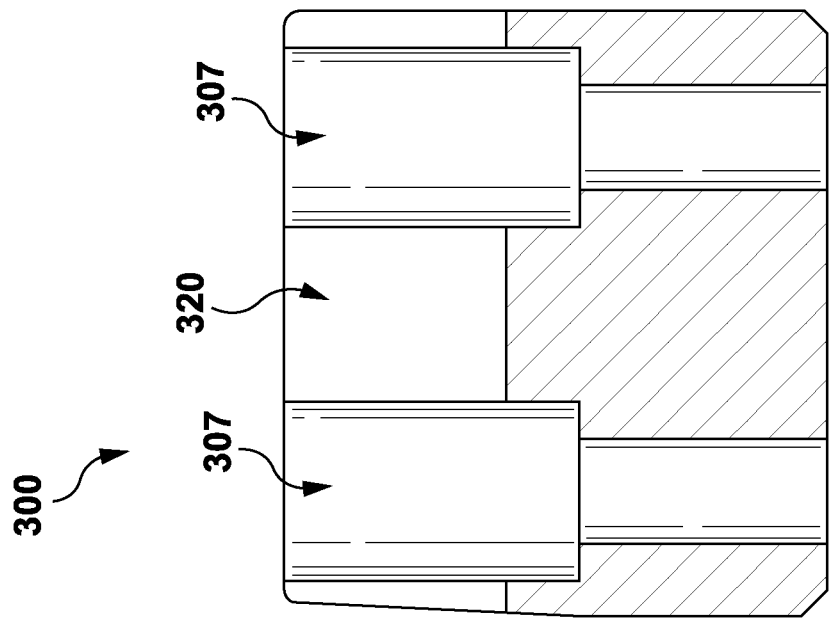
FIG. 11 depicts a cross-sectional view of the male portion of FIG. 9, taken along line 11-11 of FIG. 10.
Figure 10:
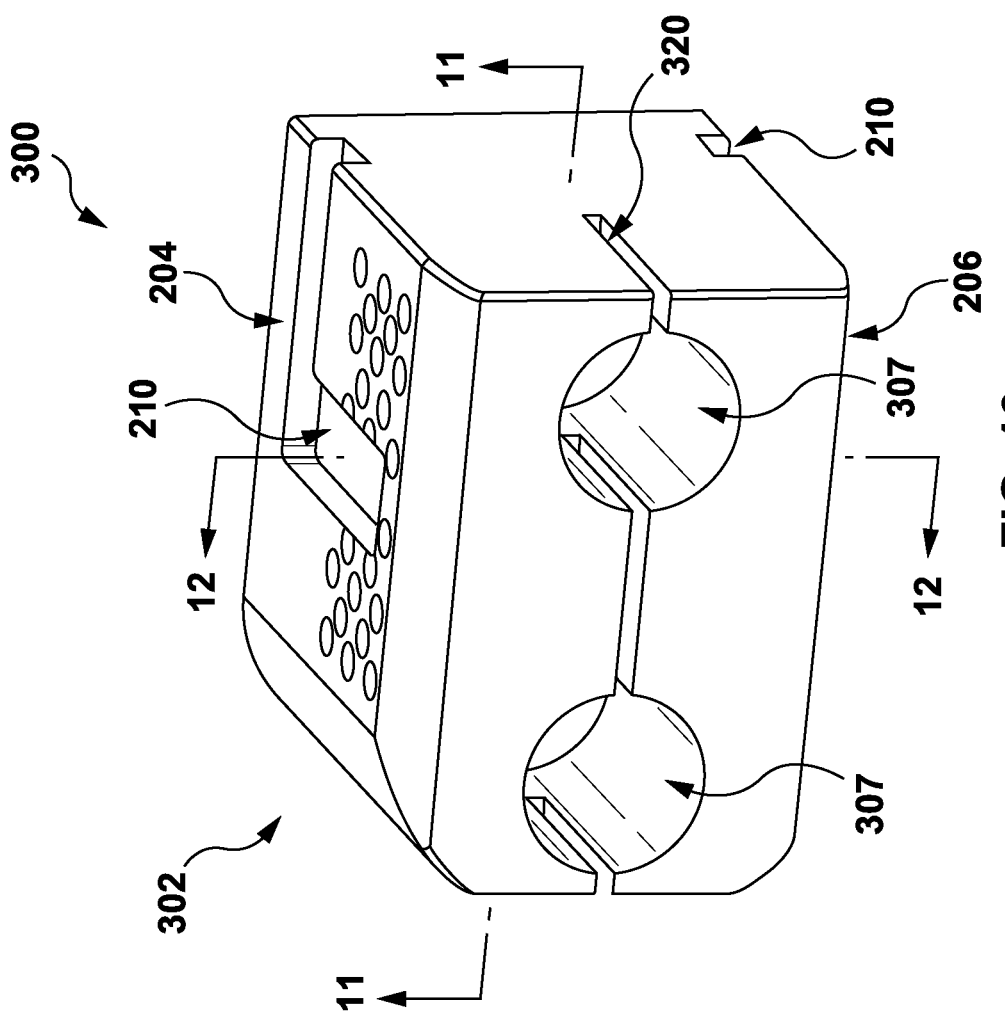
FIG. 10 depicts a perspective view of the male portion of FIG. 9.

The male portion 302 also defines two counter-bored through-holes 307 for receiving bolts (not shown) for connecting the male portion 302 to stationary component 102. As can be seen in FIG. 11, the counter-bored portion of the counter-bored through-holes 307 are recessed further into the male portion 302, such that the bolt heads, once the male portion 302 is installed on the molding structure 100, do not overlap (or otherwise interfere) with the decoupling slot 320.

It is contemplated, as for the misalignment sensing system 200, that the misalignment sensing system 300 could be reversed where the male portion 302 is instead coupled to the moveable component 104, and a female portion (not shown) of the misalignment sensing system 300 could be defined in stationary component 102.

Remaining portions of the misalignment sensing system 300 are substantially the same as the misalignment sensing system 200 described above and as such will not be described here.

Figure 13:
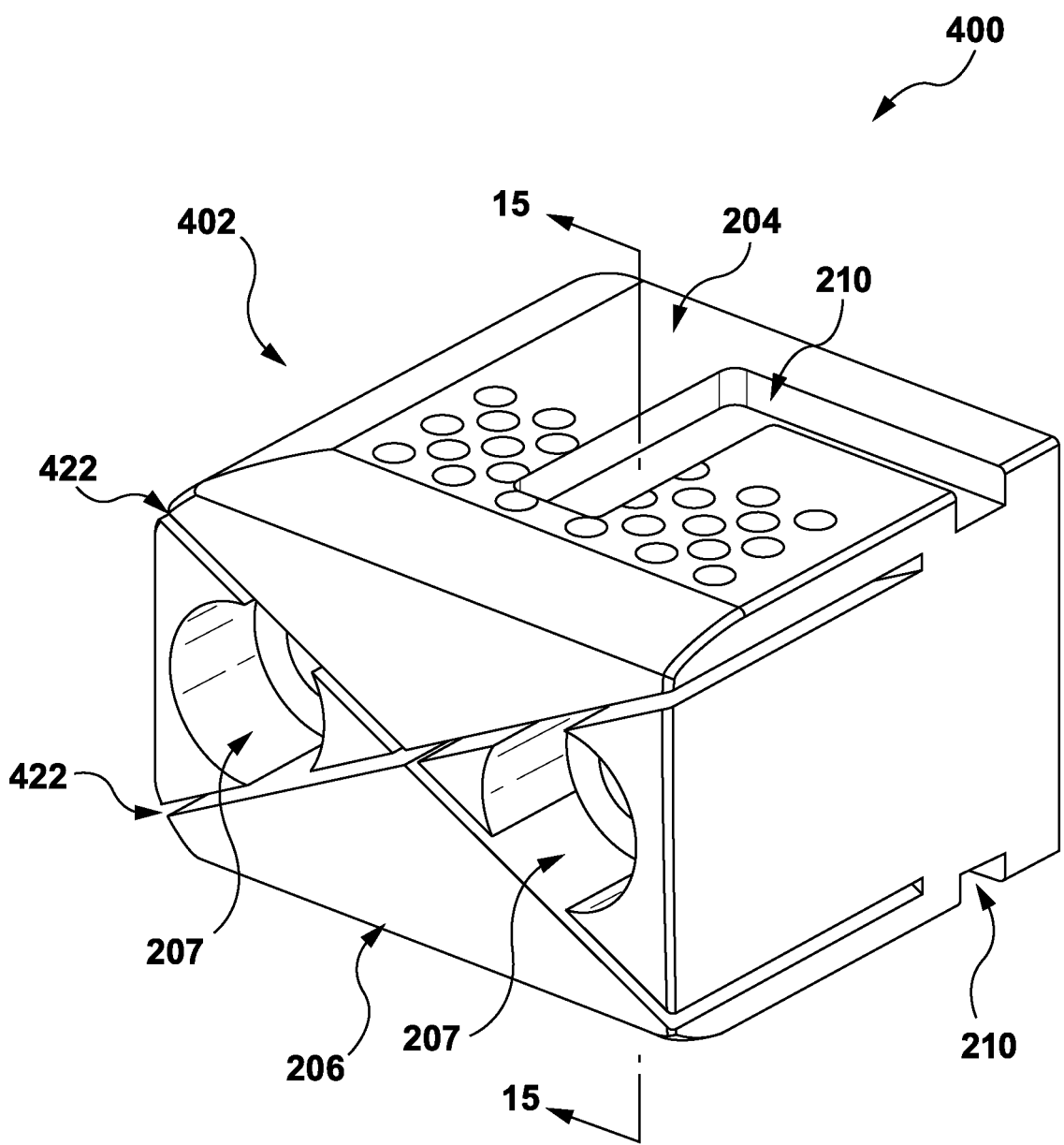
FIG. 13 depicts a perspective view of a male portion of an alignment feature implemented in accordance with another non-limiting embodiment of the present technology.
Figure 14:
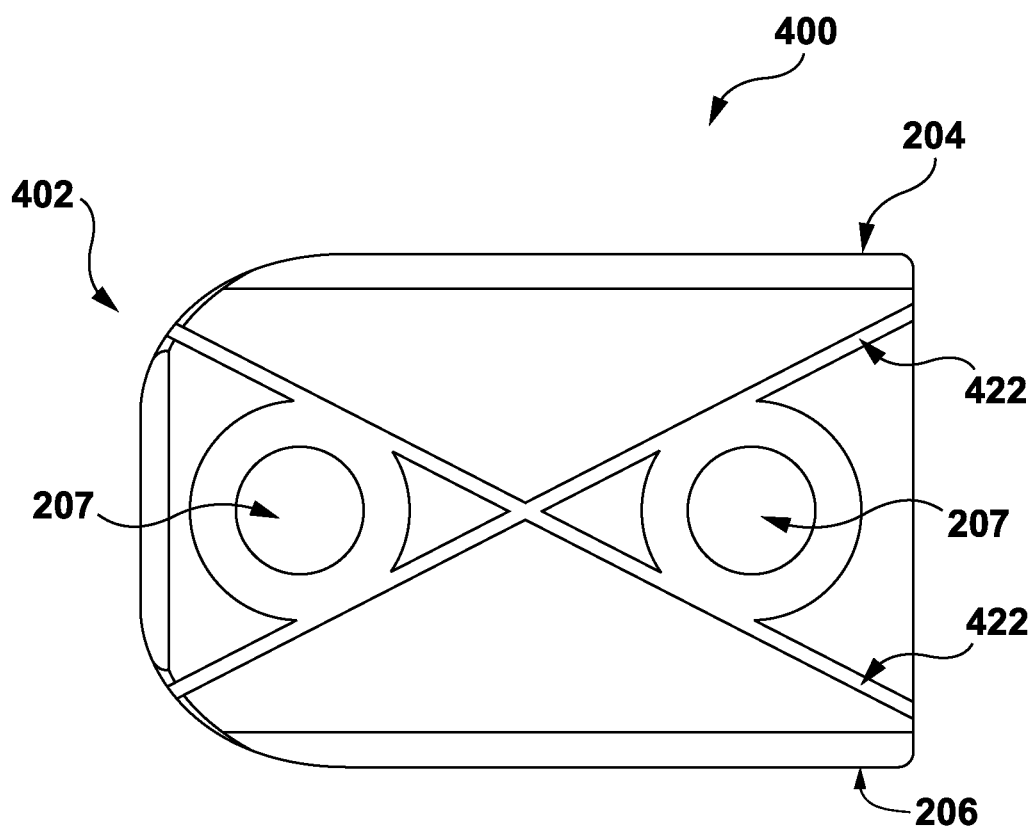
FIG. 14 depicts an elevation view of the male portion of FIG. 13.
Figure 15:
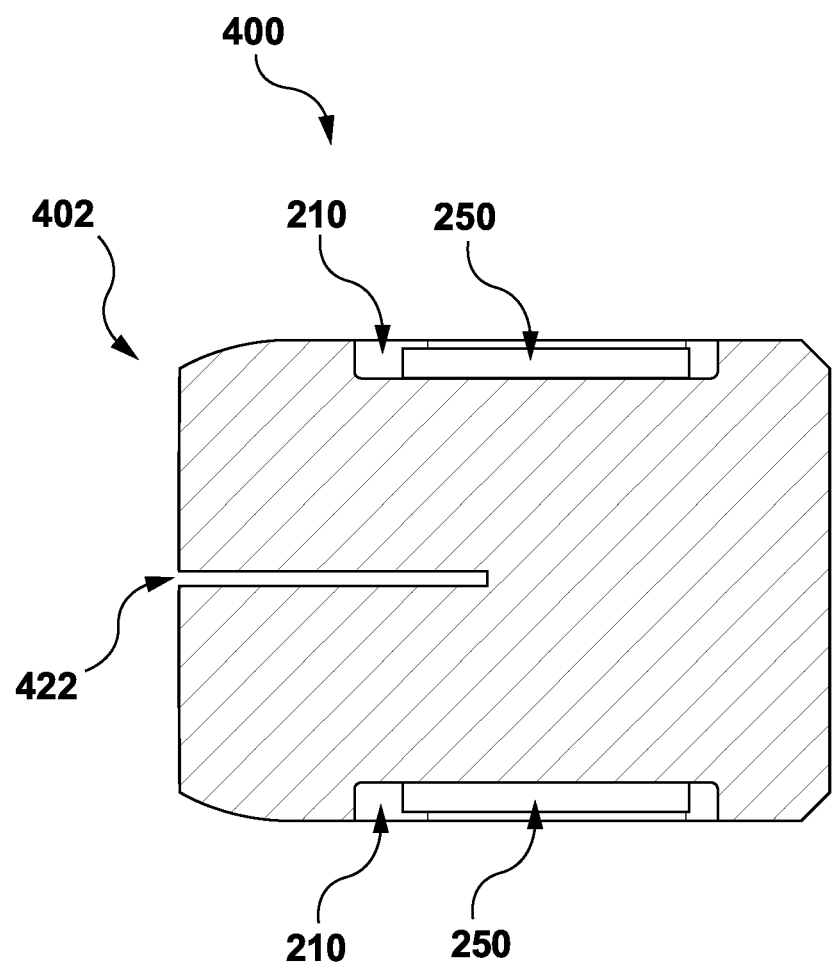
FIG. 15 depicts a cross-sectional view of the male portion of FIG. 13, taken along line 15-15 of FIG. 13.

FIGS. 13 to 15 depict another non-limiting embodiment of a male portion 402 of an alignment member of a misalignment sensing system 400 according to yet further non-limiting embodiments of the present technology. Same or similar features between the misalignment sensing system 400 and the misalignment sensing system 200 retain their same reference numeral.

The male portion 402 has two sensors 250 (not shown) disposed in the grooves 210 on the top and bottom sides 204, 206, as with the male portion 202. The male portion 402 further defines two intersecting decoupling slots 422 to allow a top portion of the male portion 402 (including the top groove 210 and sensor 250) to deform at least partially independently from a bottom portion of the male portion 402 (including the bottom groove 210 and sensor 250). Each intersecting decoupling slot 422 extends diagonally across the face of the male portion 402, from one upper corner to one lower corner, with the two intersecting decoupling slots 422 intersecting at a middle of the face of the male portion 402 (see FIG. 15). It is contemplated that the intersecting decoupling slots 422 could be differently arranged depending on the specific embodiment. As can be seen in FIG. 15, the intersecting decoupling slots 422 extend through part of the male portion 402. It is contemplated that the decoupling slots 420 could extend through more or less of the male portion 402.

Remaining portions of the misalignment sensing system 400 are substantially similar to the misalignment sensing system 200 described above and as such need not be repeated here.

Figure 16:
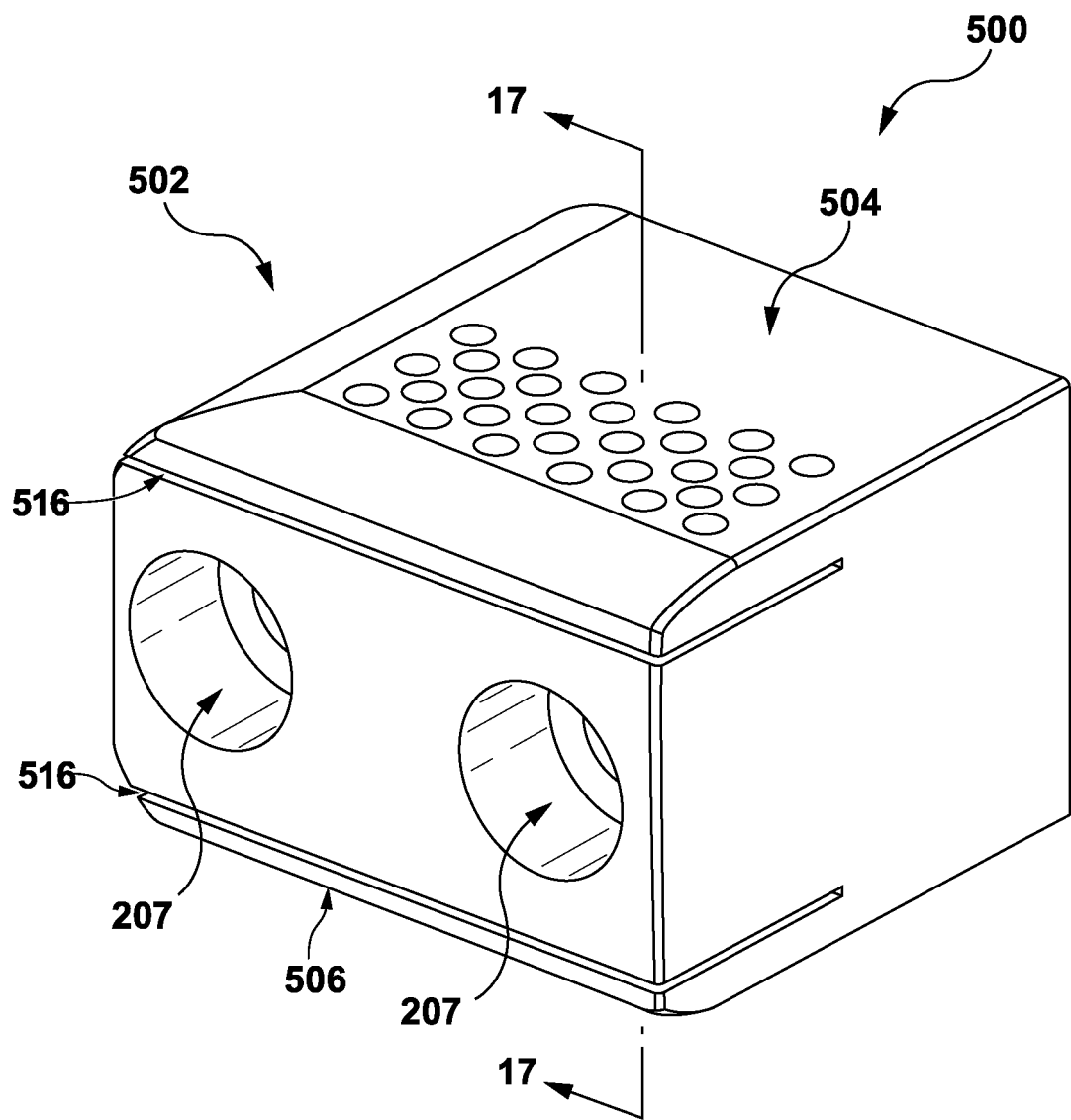
FIG. 16 depicts a perspective view of a male portion of an alignment feature implemented in accordance with yet another non-limiting embodiment of the present technology.
Figure 17:
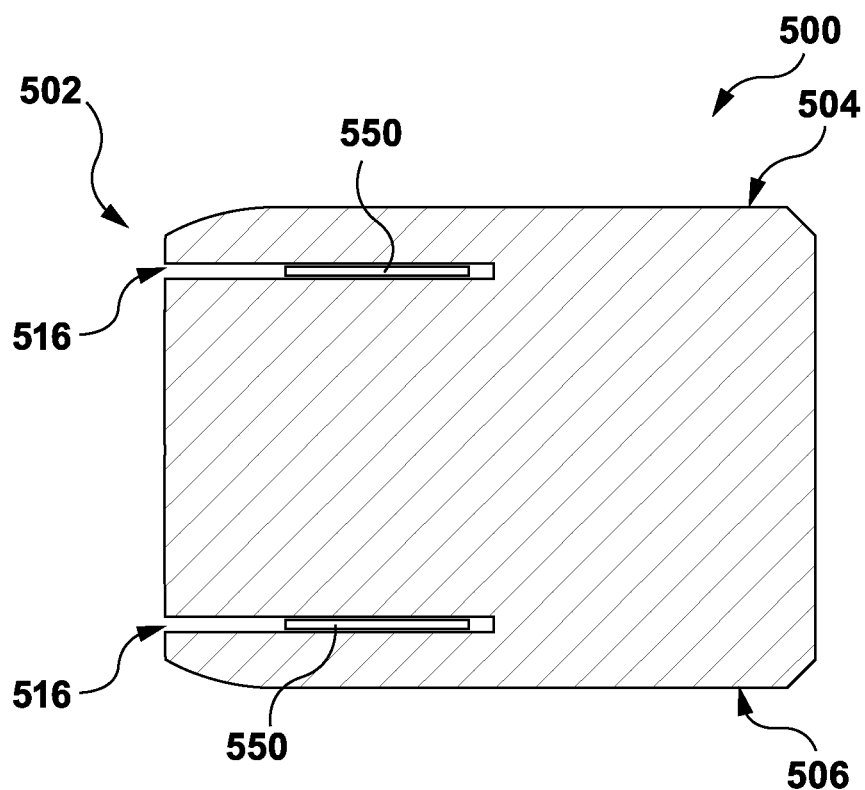
FIG. 17 depicts a cross-sectional view of the male portion of FIG. 16, taken along line 17-17 of FIG. 16.
Figure 18:
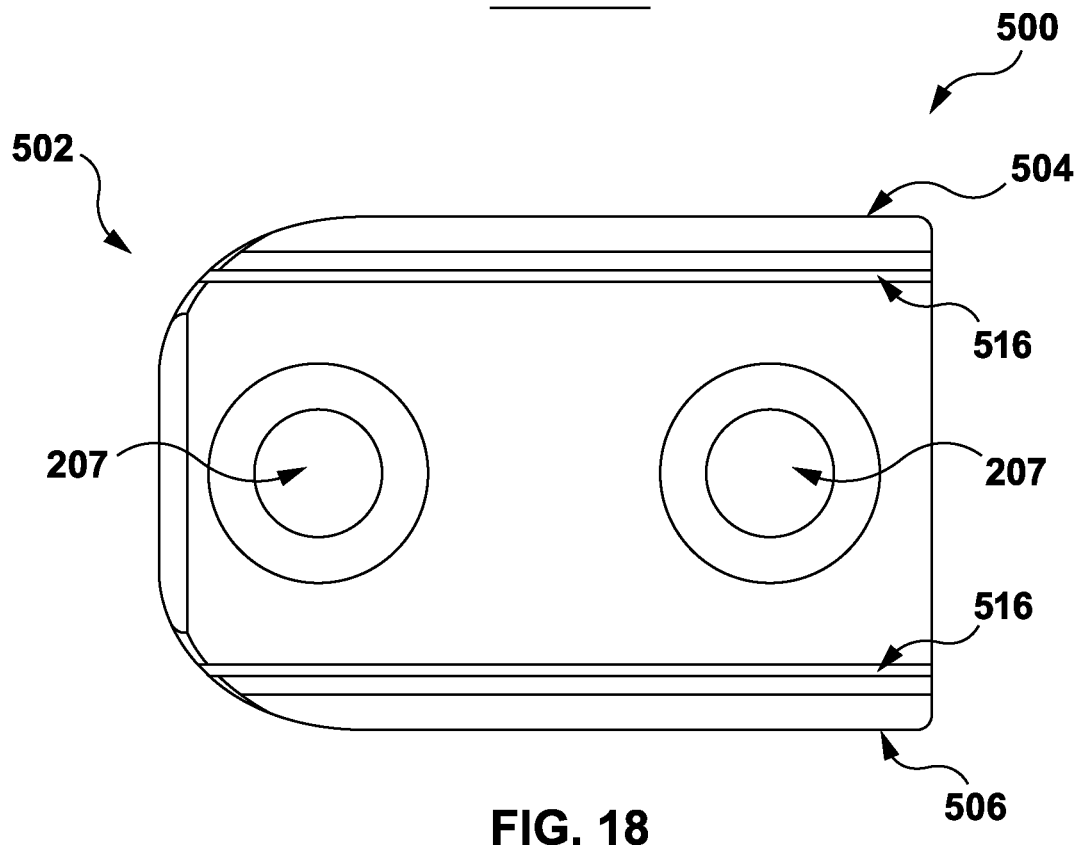
FIG. 18 depicts an elevation view of the male portion of FIG. 16.

FIGS. 16 to 18 depict yet another embodiment of a male portion 502 of an alignment member of a misalignment sensing system 500 according to the present technology. Same or similar features between the misalignment sensing system 500 and the misalignment sensing system 200 retain their same reference numeral.

The male portion 502 defines two parallel slots 516 for receiving sensors 550. In contrast to the non-limiting embodiments described above, a top surface 504 and a bottom surface 506 of the male portion 502 no longer define any grooves for receiving the sensors 550. Within each slot 516 is disposed one sensor 550, which is implemented as a Piezo film sensor 550 in this embodiment. The Piezo film sensor 550 detects misalignment of the male portion 502 with respect to its corresponding female portion (not shown) by sensing the force applied to the top surface 504 or the bottom surface 506 of the male portion 502 by the female portion.

It is contemplated, in some embodiments, that the sensors 550 could be inserted into slots defined in the female portion of the alignment member of the misalignment sensing system 500.

Remaining portions of the misalignment sensing system 500 are identical to the misalignment sensing system 200 described above and as such need not be repeated here.

It should be expressly understood that the form factor of the male portion and the female portion of the alignment member is depicted as an illustration only and other shapes are possible. Thus, while the above embodiments are all generally rectangular and are similar to straight locks generally known in the art, it is contemplated that the concepts presented above according to the present technology could also be implemented with different alignment members.

Thus, given the various embodiments of the misalignment detection systems described above, it is possible to implement a method of detecting a misalignment in a molding structure.

The method comprises:
  causing the at least one sensor to sense, during a given
    molding cycle when the molding structure is actuated
    toward the closed configuration, strain on the one of the
    female portion and the male portion;
  receiving, by the control unit, at least one strain measurement from the at least one sensor; and
  determining, by the control unit, a misalignment of the
    first component of the mold structure and the second
    component of the mold structure based on the at least
    one strain measurement.

In some non-limiting embodiments of the method, the method further comprises determining, by the control unit, based at least in part on the at least one strain measurement, information related to at least one of:

a magnitude of misalignment, and
a direction of misalignment; and the method further comprises:
  storing, in a storage device coupled to the control unit, the information; and
  storing, in the storage device, at least some additional information related to the given molding cycle of the molding structure.

In some non-limiting embodiments of the method, the method further comprises after the determining the misalignment determining that the misalignment is above a pre-determined threshold; and indicating to an operator of the molding structure, by the control unit, that the molding structure is misaligned, the indicating including at least one of:
  sounding an alarm,
  turning on a light, and
  shutting down the molding structure.

The pre-determined threshold can be pre-set by the operator based on empirical studies or the like.

In some non-limiting embodiments of the method, the method further after the determining the misalignment determining that the misalignment is above a pre-determined threshold; and presenting a message to an operator of the molding structure, on a human-machine interface (HMI) communicatively connected to the control unit, that the molding structure is misaligned. The message can further include information related to a magnitude of misalignment and a direction of misalignment.

It is noted that the foregoing has outlined some of the more pertinent non-limiting embodiments. It will be clear to those skilled in the art that modifications to the disclosed non-limiting embodiments can be effected without departing from the spirit and scope thereof. As such, the described non-limiting embodiments ought to be considered to be merely illustrative of some of the more prominent features and applications. Other beneficial results can be realized by applying the non-limiting embodiments in a different manner or modifying them in ways known to those familiar with the art.

The mixing and/or matching of features, elements and/or functions between various non-limiting embodiments are expressly contemplated herein as one of ordinary skill in the art would appreciate from this disclosure that features, elements and/or functions of one embodiment may be incorporated into another embodiment as appropriate, unless expressly described otherwise, above. Although the description is made for particular arrangements and methods, the intent and concept thereof may be suitable and applicable to other arrangements and applications.

The invention claimed is:

1. A misalignment sensing system for a molding structure, the molding structure being positionable in use in a mold for producing molded articles, the molding structure including a first component and a second component, at least one of the first component and the second component being selectively repositionable between a closed configuration of the mold structure and an open configuration of the mold structure, the misalignment sensing system comprising:
  a straight lock alignment member comprising:
    a male portion coupled to and extending from the first component of the molding structure; and
    a female portion defined in the second component of the molding structure, the female portion being configured for a complimentary fit with the male portion so as to engage the male portion when the molding structure enters a closed configuration; and
  at least one sensor connected to one of the male portion and the female portion, the at least one sensor being configured to detect a deformation of any one of the male portion and the female portion, the deformation being induced by a misalignment between the first component of the molding structure and the second component of the molding structure.

2. The misalignment sensing system of claim 1, further comprising:
  a control unit communicatively coupled to the at least one sensor, the control unit configured to receive a sensed misalignment condition from the at least one sensor for processing thereof.

3. The misalignment sensing system of claim 1, wherein the at least one sensor is disposed in at least one slot defined in the male portion.

4. The misalignment sensing system of claim 1, wherein the at least one sensor includes a first sensor and a second sensor.

5. The misalignment sensing system of claim 4, wherein:
  the first sensor is disposed in a first slot defined in the male portion of the alignment member; and
  the second sensor is disposed in a second slot defined in the male portion of the alignment member, the second slot being parallel to the first slot.

6. The misalignment sensing system of claim 4, wherein:
  the first sensor is disposed in a first groove defined on a first side portion of the male portion of the alignment member; and
  the second sensor is disposed in a second groove defined on a second side portion of the male portion of the alignment member, the second side being opposite the first side.

7. The misalignment sensing system of claim 6, wherein the male portion is configured to define at least one decoupling slot for allowing the first side portion and the second side portion to deform at least partially independently.

8. The misalignment sensing system of claim 7, wherein the at least one decoupling slot is between and parallel to the first side portion and the second side portion.

9. The misalignment sensing system of claim 7, wherein the at least one decoupling slot comprises two intersecting slots.

10. The misalignment sensing system of claim 1, wherein the at least one sensor comprises at least one of a Wheatstone bridge strain gauge and a Piezo film sensor.

11. A method of detecting misalignment using a misalignment sensing system in a molding structure for producing molded articles, the molding structure including a first component and a second component, at least one of the first component and the second component being selectively repositionable between a closed configuration of the mold structure and an open configuration of the mold structure, the misalignment sensing system including:
  a straight lock alignment member including:
    a male portion coupled to and extending from the first component of the molding structure, and
    a female portion coupled to the second component of the molding structure, the female portion being configured for a complimentary fit with the male portion so as to engage the male portion when the molding structure enters a closed configuration;
  at least one sensor connected to one of the male portion and the female portion, the at least one sensor being configured to detect a deformation of any one of the male portion and the female portion, the deformation being induced by a misalignment between the first component of the molding structure and the second component of the molding structure; and a control unit communicatively coupled to the at least one sensor, the control unit configured to receive a sensed misalignment condition from the at least one sensor for processing thereof;

the method being executed by the control unit, the method comprising:

causing the at least one sensor to sense, during a given molding cycle when the molding structure is actuated toward the closed configuration, strain on the one of the female portion and the male portion;

receiving, by the control unit, at least one strain measurement from the at least one sensor; and determining, by the control unit, a misalignment of the first component of the mold structure and the second component of the mold structure based on the at least one strain measurement.

12. The method of claim 11, further comprising:

determining, by the control unit, based at least in part on the at least one strain measurement, information related to at least one of:

a magnitude of misalignment, and a direction of misalignment;

storing, in a storage device coupled to the control unit, the information; and storing, in the storage device, at least some additional information related to the given molding cycle of the molding structure.

13. The method of claim 11, further comprising, after the determining the misalignment:

determining that the misalignment is above a pre-determined threshold; and indicating to an operator of the molding structure, by the control unit, that the molding structure is misaligned, the indicator including at least one of:

sounding an alarm, turning on a light, and shutting down the molding structure.

14. The method of claim 12, further comprising, after the determining the misalignment:

determining that the misalignment is above a pre-determined threshold; and presenting a message to an operator of the molding structure, on a human-machine interface (HMI) communicatively connected to the control unit, that the molding structure is misaligned.

15. The method of claim 14, where the message further comprises information related to a magnitude of misalignment and a direction of misalignment.

16. The misalignment sensing system of claim 2, wherein the at least one sensor is disposed in at least one slot defined in the male portion.

17. The misalignment sensing system of claim 2, wherein the at least one sensor includes a first sensor and a second sensor.

18. The misalignment sensing system of claim 2, wherein the at least one sensor comprises at least one of a Wheatstone bridge strain gauge and a Piezo film sensor.

19. The misalignment sensing system of claim 4, wherein the at least one sensor comprises at least one of a Wheatstone bridge strain gauge and a Piezo film sensor.

20. The misalignment sensing system of claim 9, wherein the at least one sensor comprises at least one of a Wheatstone bridge strain gauge and a Piezo film sensor.

\* \* \* \* \*